(12) United States Patent
Fujimoto

(10) Patent No.: US 7,457,512 B2
(45) Date of Patent: Nov. 25, 2008

(54) INFORMATION RECORDING DEVICE

(75) Inventor: Masahiro Fujimoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 942 days.

(21) Appl. No.: 10/878,480

(22) Filed: Jun. 29, 2004

(65) Prior Publication Data

US 2005/0063665 A1    Mar. 24, 2005

(30) Foreign Application Priority Data

Sep. 24, 2003    (JP) ............................. 2003-330933

(51) Int. Cl.
*H04N 7/00* (2006.01)
(52) U.S. Cl. ........................................ 386/46; 386/107
(58) Field of Classification Search .................. 386/46, 386/107, 117, 124, 38, 1
See application file for complete search history.

(56) References Cited

FOREIGN PATENT DOCUMENTS

| JP | 2001-167491 A | 6/2001 | |
|---|---|---|---|
| JP | 02002125188 | * | 4/2002 |
| JP | 2003-199029 | | 7/2003 |
| WO | WO 92/22983 | * | 12/1992 |

OTHER PUBLICATIONS

Japanese Office Action, issued in Japanese Patent Application No. 2003-330933, dated on Nov. 27, 2007.

* cited by examiner

*Primary Examiner*—Robert Chevalier
(74) *Attorney, Agent, or Firm*—McDermott Will & Emery LLP

(57) ABSTRACT

An information recording device includes an input unit entering input data, a transmission unit sending the data entered by the input unit, a reception unit receiving information data, a received data management unit adding a flag indicating the received information data to the information data received by the reception unit, a recording unit recording the information data received by the reception unit and the flag, and a control unit controlling the information data recorded by the recording unit to be changed to overwritable data in accordance with the flag recorded by the recording unit, thereby adding a flag to received data and performing a control to set the data attached with the flag to overwritable data.

10 Claims, 5 Drawing Sheets

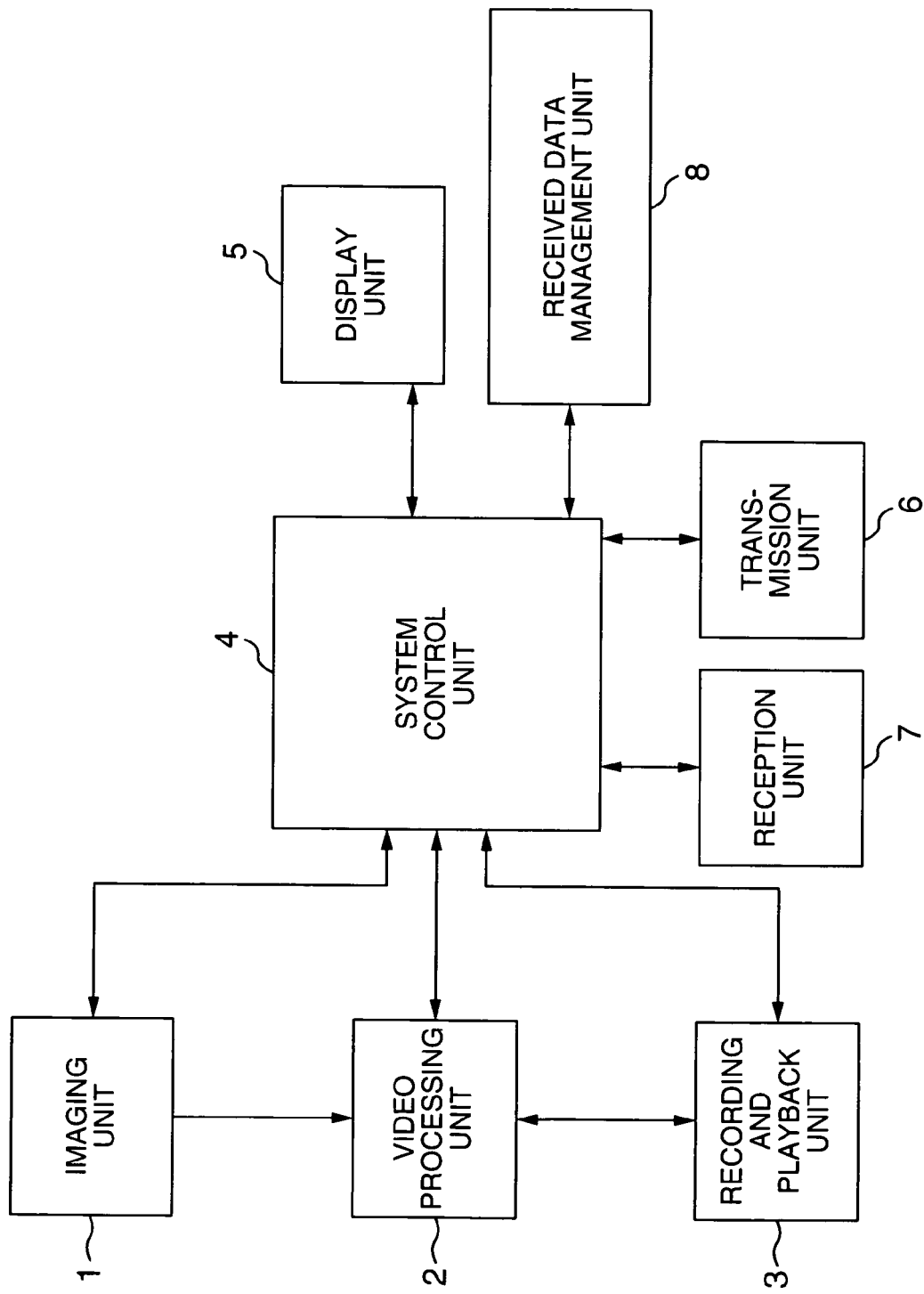

FIG. 2A

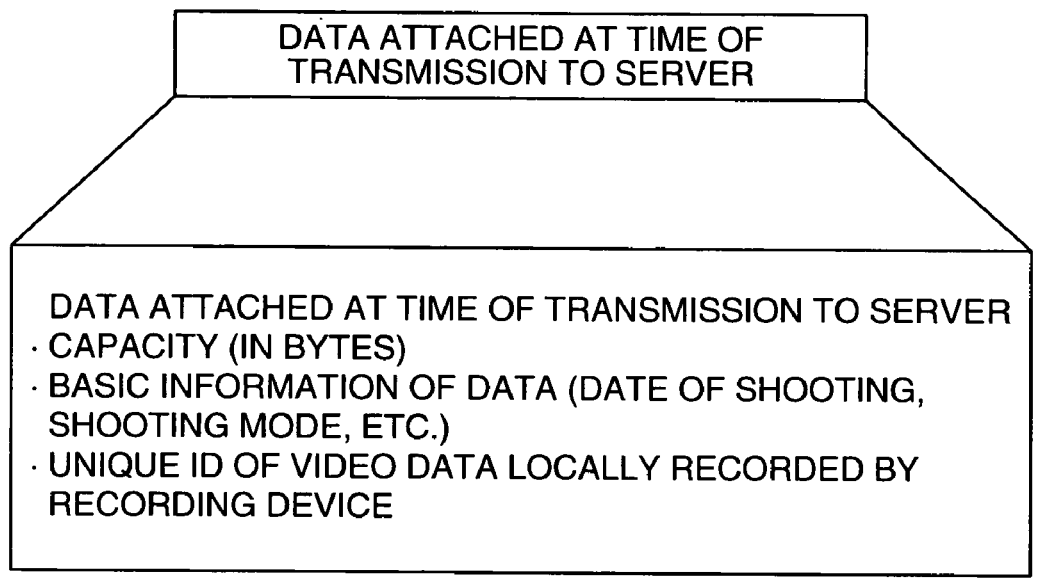

DATA ATTACHED AT TIME OF TRANSMISSION TO SERVER
· CAPACITY (IN BYTES)
· BASIC INFORMATION OF DATA (DATE OF SHOOTING, SHOOTING MODE, ETC.)
· UNIQUE ID OF VIDEO DATA LOCALLY RECORDED BY RECORDING DEVICE

FIG. 2B

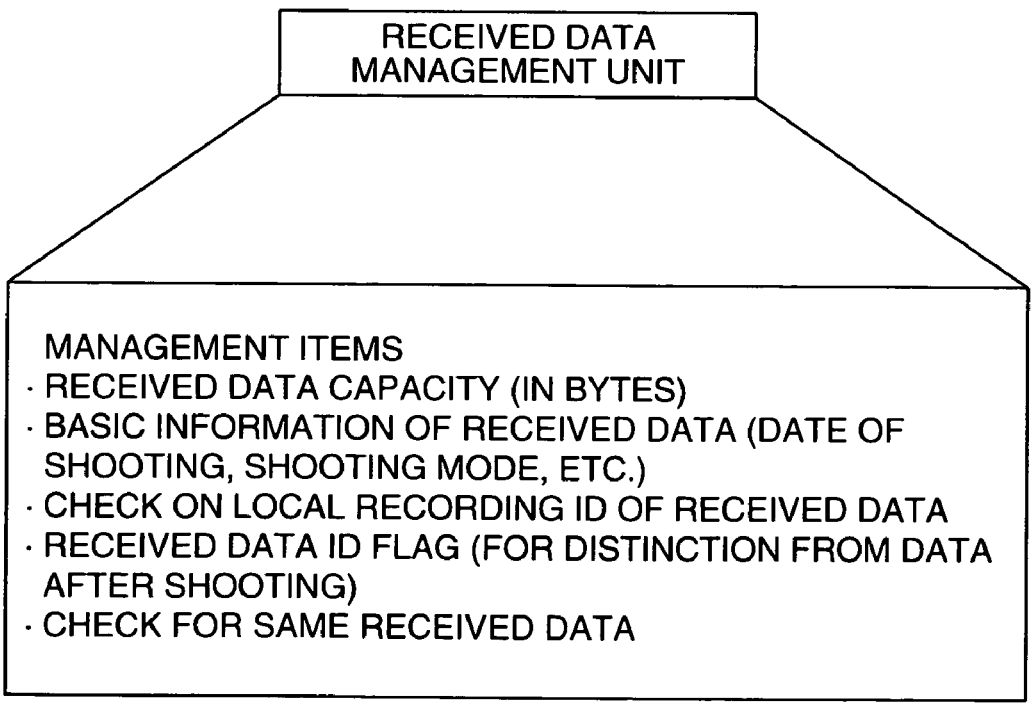

MANAGEMENT ITEMS
· RECEIVED DATA CAPACITY (IN BYTES)
· BASIC INFORMATION OF RECEIVED DATA (DATE OF SHOOTING, SHOOTING MODE, ETC.)
· CHECK ON LOCAL RECORDING ID OF RECEIVED DATA
· RECEIVED DATA ID FLAG (FOR DISTINCTION FROM DATA AFTER SHOOTING)
· CHECK FOR SAME RECEIVED DATA

RECORDABLE AREA BEFORE VIDEO DATA IS RECEIVED

FIRST MODE (AFTER VIDEO DATA HAS BEEN RECEIVED)

SECOND MODE (AFTER VIDEO DATA HAS BEEN RECEIVED)

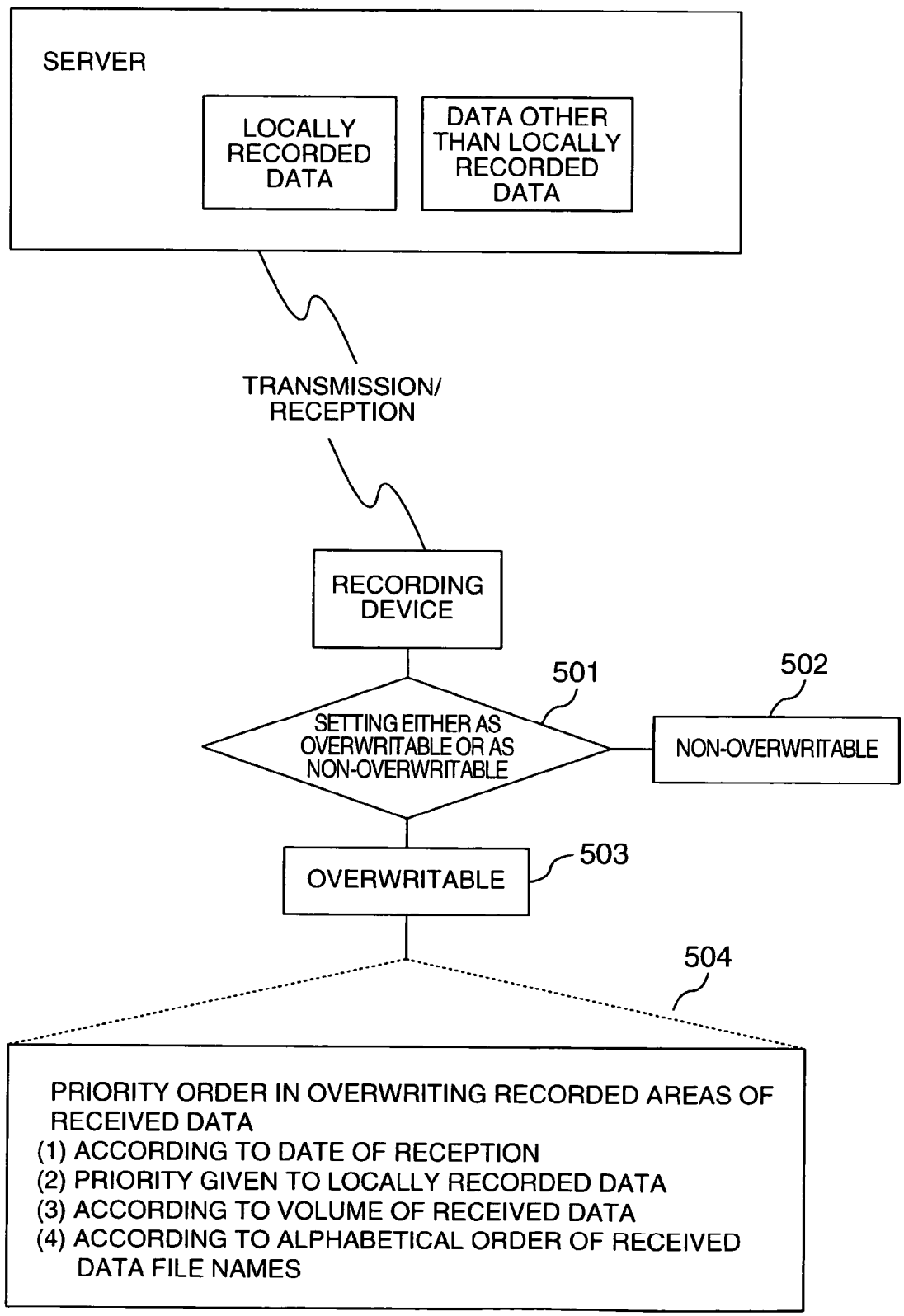

INFORMATION RECORDING DEVICE

INCORPORATION BY REFERENCE

The present application claims priority from Japanese application JP2003-330933 filed on Sep. 24, 2003, the content of which is hereby incorporated by reference into this application.

BACKGROUND OF THE INVENTION

1. Field of the Invention

The present invention relates to an information recording device capable of sending and receiving video data to and from a server and the like that store and manage, through a communication means, video data recorded in a medium in the information recording device. More particularly, the invention relates to a technology that changes an image data region on the medium in the recording device into a recordable region.

2. Description of the Related Art

To provide a digital recording and playback device capable of fully utilizing a limited capacity of a recording medium in performing an automatic video recording, there has been known a technology which secures a video recording area in the medium corresponding to the longest of video recording hours that can be set by the automatic video recording and overwrites the secured video recording area to record data (JP-A-2001-167491).

SUMMARY OF THE INVENTION

However, since the digital recording and playback device described above records data on only a local medium, if a control is performed to overwrite the local medium, the recording capacity of the device is limited by the capacity of the local medium itself. Thus the device has a problem of a severely limited recording capacity. Particularly in a portable information recording device there is a greater limitation on the recording capacity of the medium.

It is therefore an object of the present invention to provide an information recording device that can solve the aforementioned problem and effectively utilize a recording medium on the device.

To solve the above problem, the information recording device of the invention sends input data to an external recording device, adds a flag to received data and performs a control to set the data attached with the flag to overwritable data.

By sending the input data to the external recording device, the recording capacity of the device is free from the limitation of the local recording medium. If communication with the external recording device is not possible, since the data attached with a flag is made overwritable, the local medium can be effectively utilized. This arrangement is particularly advantageous with a portable information recording device because the recording capacity of a medium on the portable device is severely limited and because the portable device often encounters situations where the communication with the external recording device cannot be established.

With this invention, an information recording device capable of effectively utilizing a recording medium on the device can be provided.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing an information recording device with a unit for changing a received data area to a recordable area.

FIGS. 2A and 2B are diagrams showing a unit for managing the received data.

FIG. 3 is a flow chart in receiving data from a server or the like.

FIG. 5 is an explanatory diagram showing a process of setting recorded areas of the data received from the server as overwritable or non-overwritable and of selecting a priority order in which the recorded areas are overwritten.

DETAILED DESCRIPTION OF THE EMBODIMENTS

Figure 3:
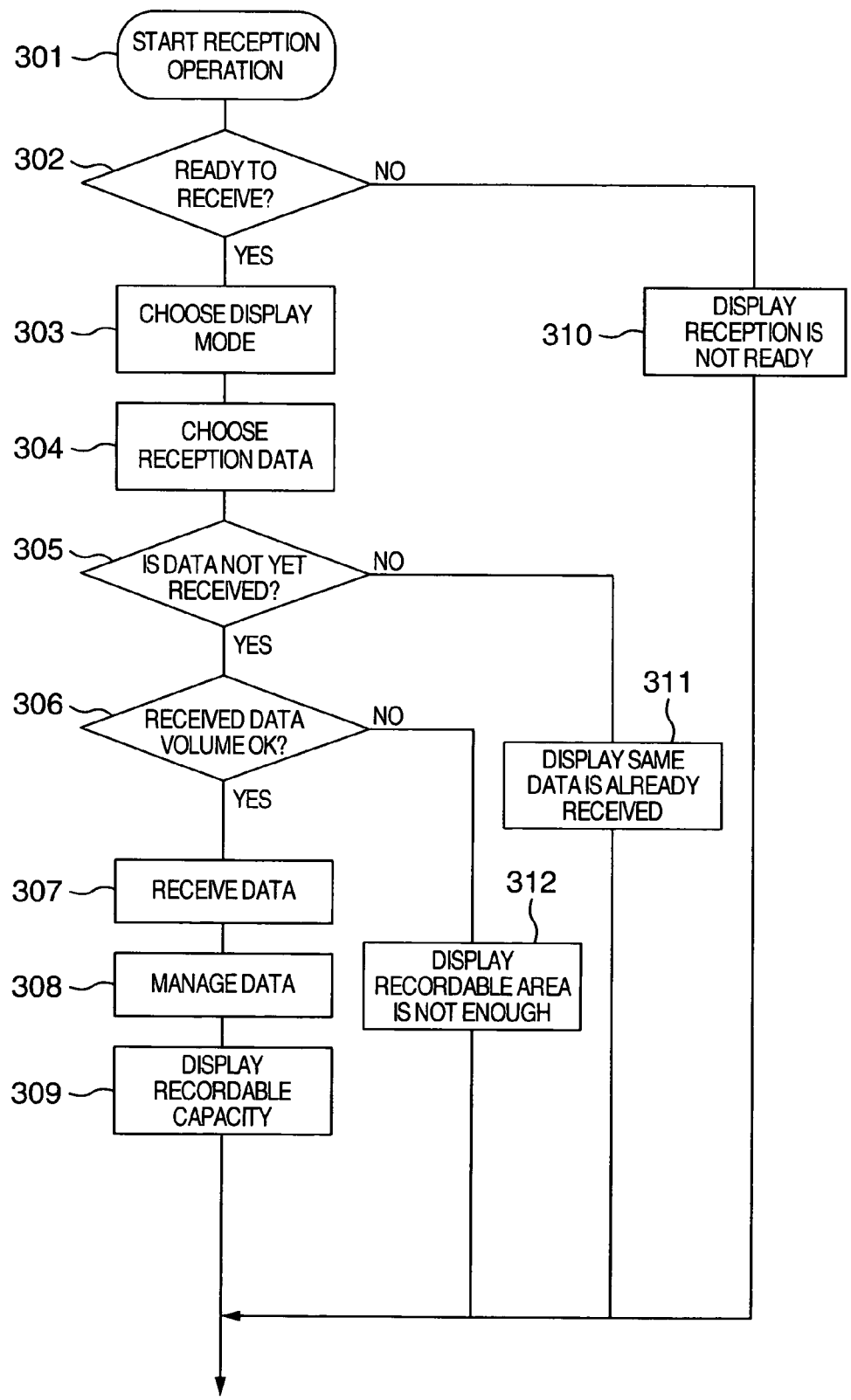

Hereinafter, embodiments of this invention will be described with reference to FIG. 1 to FIG. 5. FIG. 1 represents a block diagram of an information recording device in one embodiment which sets, to a recordable area, a recording area for video data received from a server, among the video data being recorded on a recording medium of the information recording device.

An operation during a recording process will be explained first. An imaging unit 1 includes a lens, a CCD (charge-coupled device) sensor, A/D converter and the like, and converts a video signal (or optical signal) into an electric signal by a control from a system control unit 4. The converted electric signal is compressed and transformed into video data by a video processing unit 2 controlled by the system control unit 4. The video data is further transformed by a recording and playback unit 3 into a more suitable form of the video data. The video signal from the video processing unit 2 is converted by the system control unit 4 into a form of video signal conforming to a size and the number of pixels of a liquid crystal display that forms a display unit 5. The converted video signal is then displayed on the display unit 5.

The recording and playback unit 3 in this embodiment may be constructed of a hard disk drive (HDD) or a non-volatile memory device. A recording medium is not limited to these and may also be a removable recording medium including optical discs. Two or more recording media may be used.

Next, an operation during a playback will be explained. The recording and playback unit 3 reproduces the recorded video data and sends the video data to the video processing unit 2 where it is decoded into a video signal which is then displayed on the display unit 5 through the system control unit 4.

Next, the process of sending and receiving video data when the device is within a communication range will be explained. In the transmission process, when a predetermined operation procedure is performed or a predetermined condition is met, the video data recorded in the recording and playback unit 3 is sent by a transmission unit 6 through the system control unit 4 to an external recording means such as a server where it is recorded. When the device is within a communication range, the video data is transmitted to the external recording means. So if the recording capacity is severely limited as in a portable device, the device is free from the limitation on the recording capacity.

At this time, additional data such as date of shooting or taking a picture and a local recording ID, are also transmitted along with the video data. In a reception process, a predetermined operation procedure causes a reception unit 7 to receive video data from the server which is then recorded in the recording and playback unit 3. At the same time, the additional data such as a date of taking a picture and a self-recording ID are also received.

In this embodiment, a received data management unit 8 is provided which adds a variety of management information, such as the additional data for the received video data and a flag for identifying the received data, to the video data after reception and manages the flag information. The recording and playback unit 3 stores the received video data from the server and the video data from the imaging unit 1. Of the video data stored in the recording and playback unit 3, the received video data can be identified by the reception data ID flag. The recorded area of the video data that is identified as the received video data can be made a recordable area. Further, the information on this recordable area is shown on the display unit 5 through the system control unit 4.

Further, by adding a device-inherent ID to the video data that is locally recorded in the recording and playback unit 3 of the recording device, it is possible to determine whether the video data being received from the server is the one that was previously transmitted from this recording device to the server. If an arrangement is made to identify whether the video data being received from the server is one that was previously recorded locally or one that was recorded by other device, it is possible to select one of the following modes: a first mode in which an area of the received video data is not set as a recordable area, a second mode in which an area of the received video data is set as a recordable area, and a third mode in which an area of the received video data that was previously recorded locally is set as a recordable area. That is, since the user knows which server the locally recorded video data is stored in, the video data can easily be received again if the area in question is overwritten. If the remaining capacity for recording becomes small, the recorded areas are changed into overwritable areas, beginning with those areas of the locally recorded video data, thus enhancing the usefulness of the device.

Referring back to FIG. 1, of the blocks shown in the drawing, the video processing unit 2, system control unit 4 and received data management unit 8 may be composed of software programs at least.

Next, management items for managing and identifying received data will be explained by referring to FIGS. 2A and 2B. FIGS. 2A and 2B show examples of management items managed by the received data management unit 8.

First, FIG. 2A shows data to be added to the video data during transmission of the recorded video data. They include a volume of the video data to be sent (in bytes), basic information on the video data (date of taking or shooting, shooting mode, etc.) and a device-inherent ID of the video data locally recorded by the recording device. The ID may be whatever information can identify the video data, such as unique serial number.

FIG. 2B shows information to be managed during reception. When video data is received, information including the volume of the video data received, the basic information on the video data and the local recording ID is also received by the reception unit 7 of FIG. 1. Then a reception data ID flag indicating that the data has been received from the server is added to the video data thus received. By using the reception data ID flag and/or the local recording ID, it is possible to distinguish between the recorded area of the video data received from the server and/or the recorded area of the video data that was locally recorded and received from the server, and the recorded area of the video data that has not yet been sent to the server. The result of this identification is shown on the display unit 5.

In this embodiment, the volume and the basic information of the received data may be used to check whether the data being received is the same as the one already recorded, in order not to receive the same data again. For example, if the same data as the video data that is going to be received is present, this is annunciated on the display unit 5, thus avoiding the reception of the same video data. The basic information used here may, for example, be a date of shooting and a shooting mode.

Next, a flow of processing in receiving video data from the server and displaying a recordable area will be explained by referring to FIG. 3. FIG. 3 shows an example flow chart showing a sequence of steps to receive video data from the server.

First, at step 301, a video data reception operation is started. Step 302 checks if the recording device is ready to receive the video data. If the reception is not possible, step 310 indicates on the display that the reception is not permitted. If step 302 finds that the recording device is ready to receive, a mode selection is made in step 303. The modes to be selected here are a first mode in which the recorded area of the received video data is not made a recordable area and a second mode in which the recorded area of the received video data is made a recordable area. By changing the mode the recordable area in the recording and playback unit 3 is controlled by the system control unit 4 and the received data management unit 8 of FIG. 1.

Next, at step 304 video data to be received is chosen. Then, at step 305 a check is made of the volume and the basic information of the video data to be received to prevent the same video data that is already recorded or received from being received again. By using the volume and the basic information of the video data, a check is made to see if there is already the same video data in the recording and playback unit 3. If the same video data is found, step 311 indicates that the same data is already received.

If step 305 finds that the same video data does not exist in the recording and playback unit 3, step 306 checks the volume of the video data to be received and, if it is less than the volume of the recordable area, the video data in question is received at step 307. At step 308 the video data received is managed by the received data management unit 8 of FIG. 1 and then step 309 displays the recordable area after the reception of the video data. If at step 306 the volume of the video data being received is found to be larger than the recordable area, step 312 indicates that the remaining recordable area is not enough.

Then, if the received video data is recorded in the second mode, the video from the imaging unit 1 of FIG. 1 will be recorded in this recordable area. Therefore, if the second mode is chosen for example, overwriting can be done on the recorded area of the received video data.

While in this embodiment the mode has been described to be selected at time of data reception, the mode selection may be made at other timings. For example, the mode may be selected after step 309 or even during recording.

In all the embodiments described above, it is noted that the present invention is effective regardless of a size of storage capacity. The video data may be a moving image or a still image.

Next, by referring to FIG. 4, the first mode and the second mode used to manage the recorded area will be explained. When video data is received from a server that performs recording and management of images, the received data management unit 8 of FIG. 1 manages the received video data by activating the first mode or second mode. The first mode is a mode that does not set as recordable the recorded area of the received video data, i.e., a mode which makes a data-empty area a recordable area. The second mode is a mode that sets as recordable the recorded area of the received video data, i.e., a mode which sets as recordable a sum of the recorded area of the received video data and a data-empty area after the video data reception. FIG. 4 shows example conceptual diagrams representing recordable areas before and after the reception of video data.

Figure 4A:
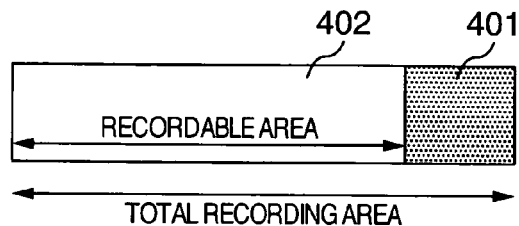
FIGS. 4A, 4B and 4C are conceptual diagrams showing a mode of a recordable area in the information recording device in receiving video data from the server.
Figure 4B:
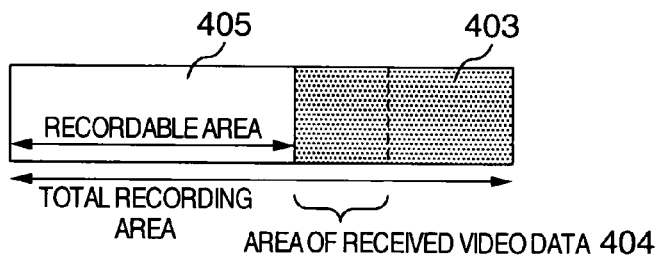
Figure 4C:
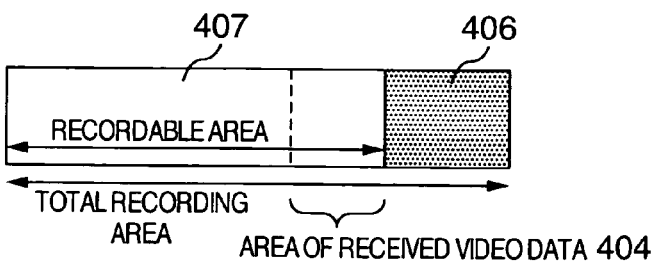

The received data management unit 8 of FIG. 1 manages the recordable area by using a reception data ID flag to distinguish between the recorded area of shot video and the recorded area of the received video data. FIG. 4A shows a recordable area before the video data is received, which consists of a recorded area 401 (shaded portion) and a recordable area 402. In this state when video data is received, the recordable area will be as shown in FIG. 4B in the first mode and as shown in FIG. 4C in the second mode. In the first mode shown in FIG. 4B, since the recorded area of the received video data is not handled as a recordable area, it is seen that a recorded area 403 (shaded portion) has increased by a volume equal to the area of the received video data 404 and that a recordable area 405 has decreased by the same volume. In the second mode shown in FIG. 4C, since the area of the received video data is handled as a recordable area, a recordable area 407 does not decrease. Therefore, the user can make effective use of the recording capacity of the recording and playback unit 3. For example, under normal condition the recordable area display may be set to the first mode and, when the recordable area becomes small, to the second mode to expand the recordable area and thereby secure the area for shooting. In this case, since the received data is saved in the server, the recorded area can be overwritten without trouble. Further, the video data can be received again from the server as long as there is a recordable area.

The currently active mode can be checked by displaying it on the display unit 5 of FIG. 1.

FIG. 5 shows that, when recorded areas of data received from the server are set as recordable areas (FIG. 4C), the recorded areas of received data can be handled efficiently by setting them as overwritable or non-overwritable or by selecting an order of priority in which the recorded areas are overwritten. When data is received from the server, step 501 may set the recorded area of the received data as overwritable or non-overwritable. Setting the received data area as non-overwritable can protect data which one does not want erased, such as a travel map, from being deleted erroneously (step 502). If all recorded areas of the received data are set non-overwritable and the entire recording capacity becomes full of recorded areas, making further recording impossible, this state may be indicated on the display unit 5. Further, it is possible to indicate whether overwriting is permitted or not. If overwriting is permitted, the indication may also include whether the overwriting is done on the recorded areas of received data that are set as non-overwritable or on the normal recorded data areas. This arrangement allows the user to easily determine whether or not to overwrite according to the importance of individual video data, improving the ease of data handling.

Next, how an overwriting priority order is determined for the data areas that were set as overwritable (step 503) will be explained. For example, if the overwriting priority order is set according to the date of reception (item (1)), data received recently which is likely to be used frequently can be kept until a later date. Further, if data other than the locally recorded data is received, the locally recorded received data that can be received again may be given a higher priority (item (2)) to ensure that those data that may not be able to be received again can be kept until a later date. Such data of course may be set as non-overwritable. Further, the priority may be set according to the volume of data or the alphabetical order of file names (item (3) and (4)) so that the received data can be kept efficiently until a later date.

Although the above embodiments concern how video data is handled, data other than video data can also be used. If data is large in volume, this invention is particularly advantageous. What can be input into the information recording device of this invention includes other data than video data, such as character text data.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording device comprising:
an input unit entering input data;
a transmission unit sending the data entered by the input unit;
a reception unit receiving information data;
a received data management unit adding a flag indicating the received information data to the information data received by the reception unit;
a recording unit recording the information data received by the reception unit and the flag;
a control unit controlling the information data recorded by the recording unit to be changed to overwritable data in accordance with the flag recorded by the recording unit;
an imaging unit taking an image; and
a transmitted data management unit adding a device-inherent ID to the video data of the image taken by the imaging unit when the video data is transmitted by the transmission unit, the device-inherent ID indicating that the video data was taken by the information recording device,
wherein, when the reception unit receives first data and second data attached with the device-inherent ID, the control unit controls to provide a priority for the second data rather than the first data in overwriting both the first and second data.

2. An information recording device according to claim 1, wherein when the transmission unit cannot send data, the control unit performs a control based on the flag recorded by the recording unit to set the data recorded by the recording unit as overwritable data.

3. An information recording device according to claim 1, wherein the control unit has a first control mode which sets the data attached with the flag to non-overwritable data and a second control mode which sets the data attached with the flag to overwritable data.

4. An information recording device according to claim 1, further comprising a display unit to display a recordable area.

5. An information recording device comprising:
an input unit which enters input data;
a transmitter which sends the data entered by the input unit;
a receptor which receives information data;
a received data management unit which adds a flag indicating the received information data, to the information data received by the receptor;

a recorder which records the information data received by the receptor, the flag and the data entered by the input unit on a recording medium;

a transmitted data management unit which adds an ID to the data entered by the input unit when the data is transmitted by the transmitter, the ID indicating that the data was entered by the input unit; and a controller which controls the information data recorded by the recorder to be changed to overwritable data in accordance with the flag recorded by the recorder, wherein, when the receptor receives first information data without the ID and second information data with the ID, the controller controls to provide a priority for the second information data rather than the first information data in overwriting information data.

6. An information recording device according to claim 5, wherein the controller performs a control based on the flag recorded by the recorder to set the data recorded by the recorder as overwritable data when a recording capacity of the recording medium is less than a predetermined value.

7. An information recording device according to claim 5, wherein when the receptor receives a plurality of the second information data, the controller performs a control to set an overwriting priority order based on a data of reception of the second information.

8. An information recording device according to claim 5, wherein the input unit is an imaging unit which takes an image.

9. An information recording device according to claim 5, wherein the controller has a first control mode which sets the data attached with the flag to non-overwritable data and a second control mode which sets the data attached with the flag to overwritable data.

10. An information recording device according to claim 5, further comprising a display to display recordable area.

* * * * *